(No Model.) 3 Sheets—Sheet 1.
J. F. PARSONS.
MAGAZINE CAMERA.
No. 524,949. Patented Aug. 21, 1894.
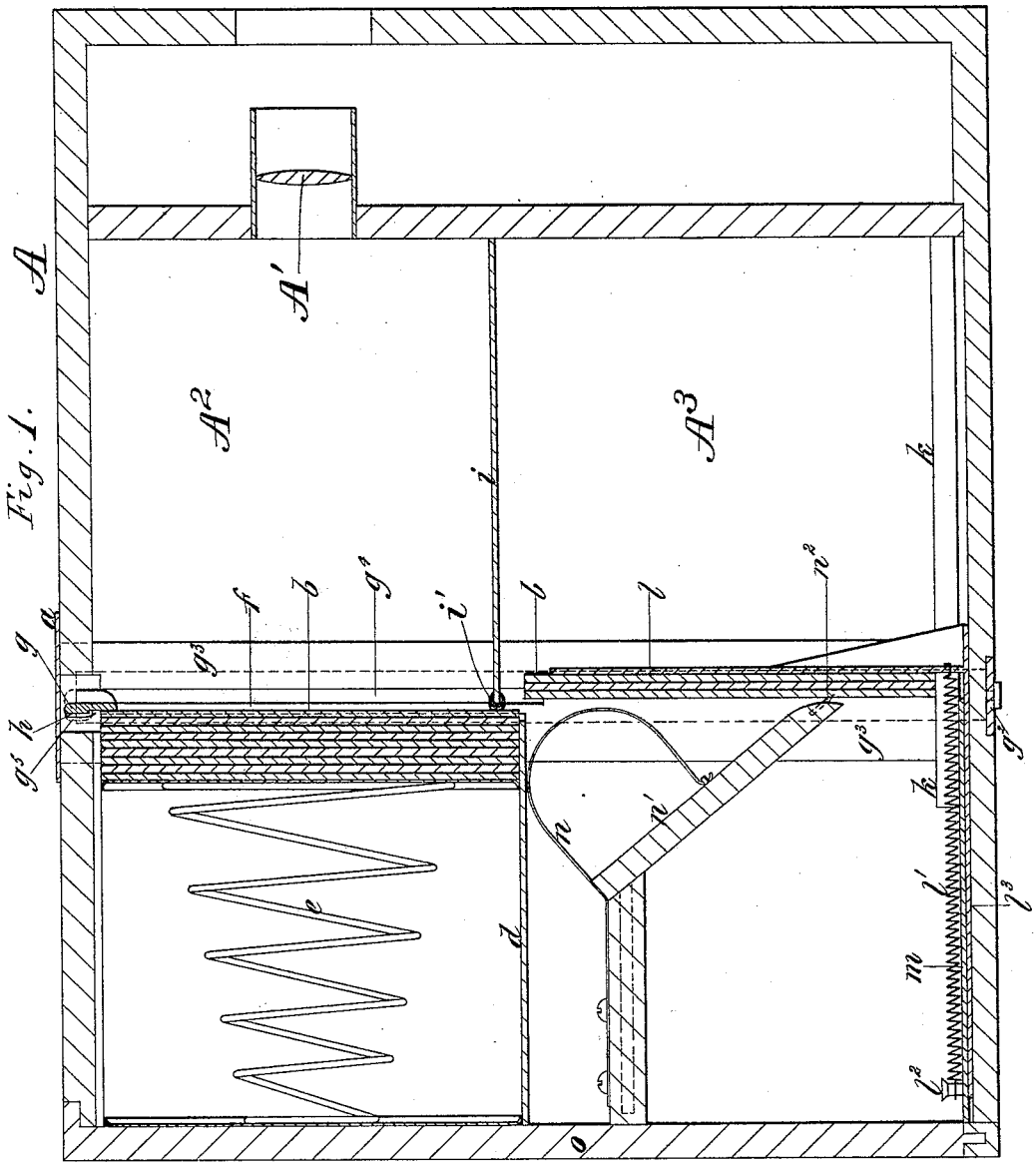
Witnesses:
J. C. Wilson
M. J. Giaussa
Inventor:
John F. Parsons
By Whitman & Wilkinson
Attorneys.

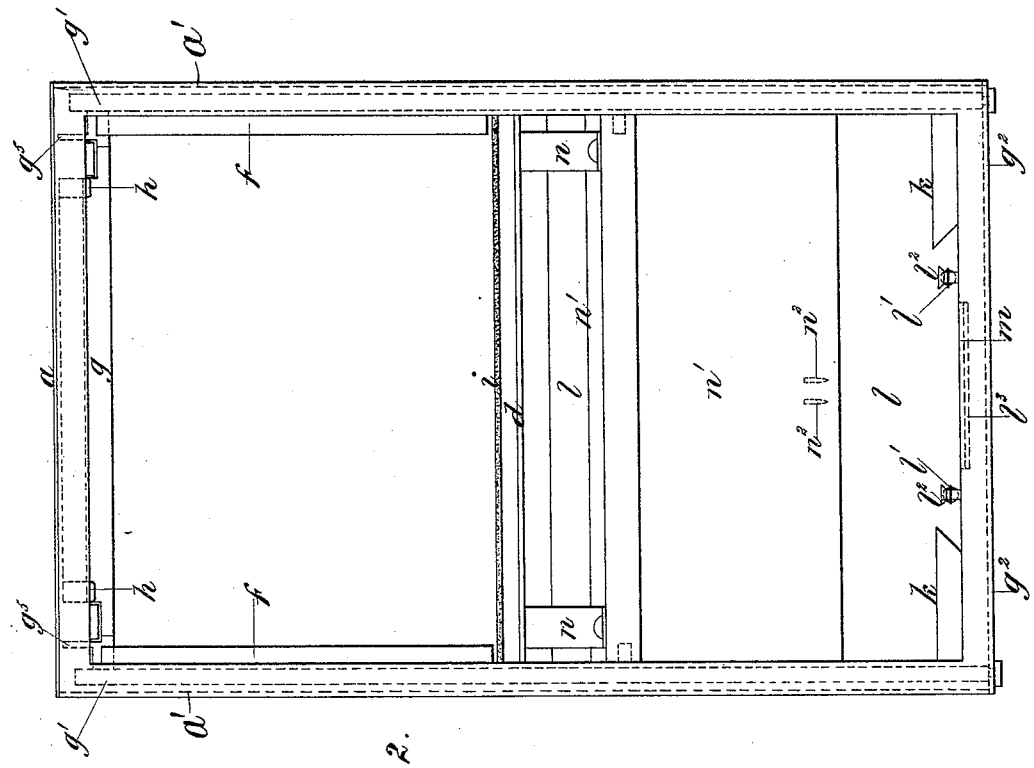

(No Model.)  
J. F. PARSONS.  
MAGAZINE CAMERA.  
No. 524,949.   Patented Aug. 21, 1894.
3 Sheets—Sheet 3.
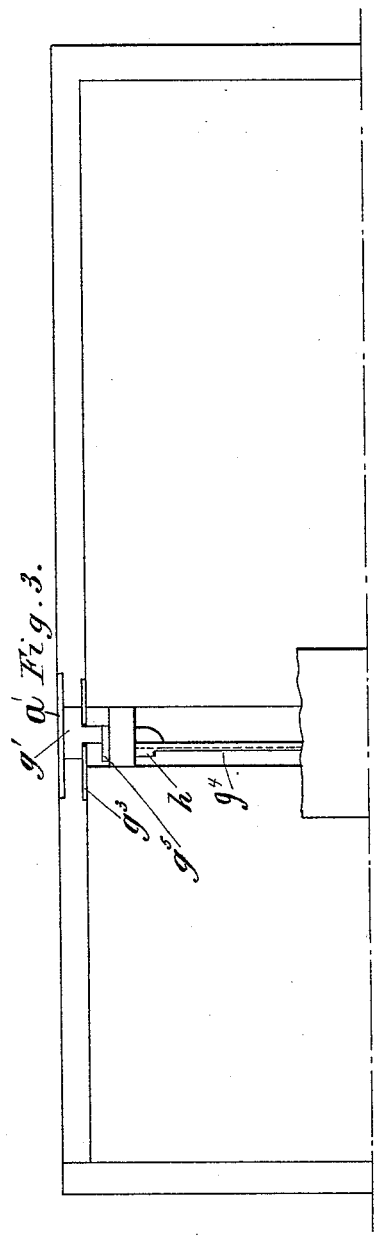
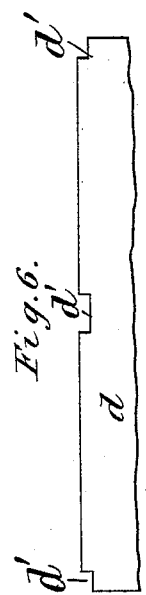
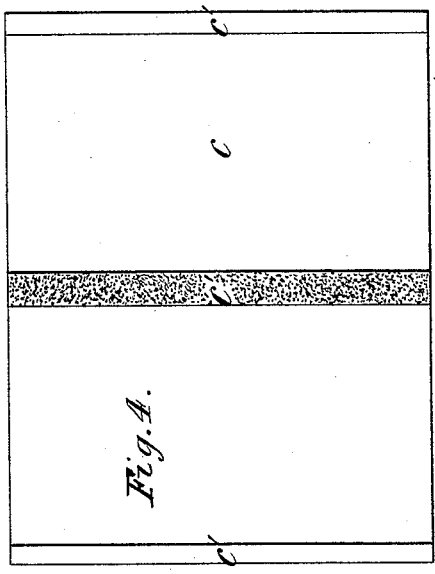
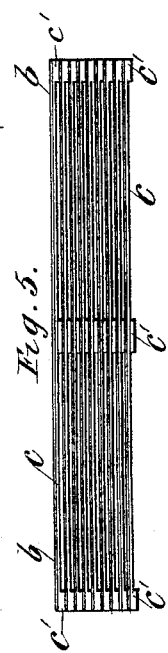
Witnesses:
Inventor:
John F. Parsons,
By Whitman & Wilkinson
Attorneys.

UNITED STATES PATENT OFFICE.

JOHN FEATHERSTONEHAUGH PARSONS, OF BRISTOL, ENGLAND.

MAGAZINE-CAMERA.

SPECIFICATION forming part of Letters Patent No. 524,949, dated August 21, 1894.

Application filed September 30, 1893. Serial No. 486,895. (No model.) Patented in England June 8, 1893, No. 11,212.

*To all whom it may concern:*

Be it known that I, JOHN FEATHERSTONEHAUGH PARSONS, a subject of the Queen of Great Britain and Ireland, and a resident of Bristol, Kingdom of England, have invented certain new and useful Improvements in Magazine Photographic Cameras, of which the following is a specification.

This invention relates to film-carrying photographic cameras, and consists in certain improvements therein whereby changing the films is effected in a ready and simple manner.

In the accompanying drawings—Figure 1 represents a longitudinal section of a film-carrying camera constructed and fitted in accordance with my invention. Fig. 2 shows an end view with the end cover removed and the compressing spring for advancing the films toward the lens taken out. Fig. 3 is a half plan of the camera with part of the top plate removed. Fig. 4 is a back view of a backing card with a set of which each camera is, under this invention, furnished. Fig. 5 is a top edge view of a pack of films and backing cards showing the upper edges of the same. Fig. 6 is a plan view of the forward edge of the platform for supporting the pack of films and backing cards.

Like letters of reference indicate corresponding parts in the several views.

Referring now more particularly to Fig. 1, A designates a film camera having the usual lens $A'$, the camera chamber proper $A^2$ and a dark chamber $A^3$ for storing the films after exposure. The camera is also provided with a door O at the back for removing the exposed films and reloading with fresh ones.

According to this invention the films are arranged in a pack with separate intervening backing cards or stiffening pieces of the kind shown at Fig. 4. A permanent set of these cards form an integral part of each camera.

At Fig. 5 is represented a pack of twelve films $b$ with a corresponding number of backing cards $c$ of cardboard, vulcanite, celluloid or other suitable substance arranged in the camera for use. The cards $c$ are furnished at the back with ribs $c'$, Figs. 4 and 5, the center one of which is a strip of velvet or other suitable fabric. The side ribs are of the same material as the cards.

When placed in the camera the combined pack of films and cards stands on the platform $d$. At the back of the pack is a spring $e$ (as is usual) which tends to advance the films and cards toward the lens. The leading film and the card behind it are restrained from advancing by being pressed against the side stops $f$, and, at the top, against the holder $g$ provided with two hooks $h$, and having a recess formed along it from end to end forming a ledge overhanging the leading film and backing card.

At bottom the films and cards are prevented by the top $i$ of the dark chamber from bulging forward. On the edge of the said top $i$ may be fixed a strip $i'$ of india rubber or velvet or other elastic material which, while preventing injurious friction on the films, does not obstruct the working of the holder $g$. When the holder $g$ is raised to its full height the hooks $h$ are clear of the top of the leading film and its backing card which then lie immediately under the said hooks. The holder $g$ is attached to vertical arms $g'$ extending down in the walls of the camera and connected across the bottom thereof by the bar $g^2$ screwed or otherwise fixed to the arms $g'$.

The grooves in which the arms $g'$ work are covered on the inside by plates $g^3$ in which are slots $g^4$ provided to enable the holder to travel vertically. The said grooves in which the arms $g'$ slide are covered on the outside by strips $a'$ to prevent light from coming through the slots $g^4$ in the plates $g$, and a similar plate $a$ is placed across the opening in the top of the camera as shown in Fig. 1.

After exposure of the leading film the holder $g$ is drawn down, the hooks $h$ and overhanging ledge of the holder engage with the top of the said film and its backing card and both are drawn down between the front end of the platform $d$ and the rear end of the top $i$ of the dark chamber.

By the provision of the ribs $c'$ a space is afforded to enable the holder $g$ to draw down one film and its backing card without engaging with the film and card next in succession. To prevent the holder $g$ from touching the film next in succession, guards $g^5$ are provided on the holder to press back the rest of the pack as the holder descends and ascends. To prevent the film and card next in succession from being drawn, by friction, down with the leading film and card, the front of the platform $d$ is carried forward to an extent which permits only one film and card to lie at once over the space between the platform $d$, and the top $i$ of the dark chamber. The platform $d$ is recessed at the edge as at $d'$ to accommodate the ribs of the backing cards, as seen at Fig. 6, which represents in plan the leading end of the platform. The ribs prevent advance of the film and card behind clear of the platform $d$. The film and backing card next in succession remain stationary until the leading film and card have been drawn down and the holder again raised to its full height. Then, by the action of the spring $e$, the now leading film and its card are thrust forward into the place previously occupied by the film and card first pulled down.

The lowered film and card stand on shelves $k$ provided on the floor of the camera and lie against a vertical plate $l$ to which is attached one end of springs $l'$ the other end being made fast as at $l^2$ by screws or otherwise. These springs $l'$ tend constantly to draw the plate $l$ away from the lens end of the camera. The distance to which the plate $l$ can be drawn by the springs $l'$ away from the lens end of the camera is limited by the plate $m$ covering the tongue $l^3$ of the plate $l$, as seen at Fig. 1. As each film and its card are drawn down, the plate $l$ is pressed toward the lens end of the camera to the extent of the thickness of the film, card and card rib. The films and cards are guided in their descent below the platform $d$ by the guides $n$ attached to the inclined table $n'$ which at foot bears against the cards and is furnished thereat with spikes $n^2$ which penetrate the center rib of velvet of the card and prevent it being drawn up when the holder is being raised. Other devices may, however, be adopted to restrain the cards from ascending with the holder.

The films and cards as they are drawn down are collected in a pack which is pressed firmly against the plate $l$ by the table $n'$ and spikes $n^2$. The guides $n$ being elastic press the lowered card and film forward beneath the roof of the dark chamber, and when the holder $g$ is raised the said card and film are released and thus prevented from assuming such a position as would be liable to obstruct the descent of the next film and card.

The table $n'$ is easily slid out of the camera, for withdrawing the exposed films, when the door $o$ is removed.

As is obvious, the arrangement may be transposed, the dark chamber being at the top and the exposing chamber at the bottom. In that case the films and cards are drawn upward instead of downward as in the arrangement above described as illustrated in the accompanying drawings.

Having thus described my invention, what I claim, and desire to secure by Letters Patent of the United States, is—

1. In a photographic camera employing films, backing sheets having hard ribs at each end, and an intermediate rib of compressible material, interposed between the films to hold them smooth and separate them from each other, a supporting platform for the pack of films having its front edge recessed to allow the ribs on the backing strips to pass freely, and means for holding the said films in an upright position and for removing the forward film and its backing sheet, substantially as described.

2. In a photographic camera employing films, backing sheets having hard ribs at each end, and an intermediate rib of compressible material, interposed between the films to hold them smooth and separate them from each other, a supporting platform for the pack of films having its front edge recessed to allow the ribs on the backing strips to pass freely, stops for the forward film to rest against and a spring to hold the pack of films against the said stops, in combination with a sliding frame, one side of which is recessed to form one of the said stops and also to take over one edge of the forward film and backing strip, and slide the same from the front of the pack substantially as described.

3. In a photographic film-carrying camera, a device such as the recessed holder $g$ provided with hooks $h$, arms $g'$ and cross-bar $g^2$, arranged to remove the foremost of the films and its backing sheet in succession, in combination with a pack of separating sheets to go between the films, and means for holding the forward film against the holder $g$, substantially as described.

4. In a photographic film camera having two dark chambers, the combination with a package of ribbed separating sheets to go between the films, a platform recessed at its front edge to support the said package of films in one dark chamber, and allow the said ribs on the separating sheets to pass freely, and a holder $g$ forming a part of a sliding frame, to slide the forward film and separating sheet away from the said pack into the other dark chamber, of a spring actuated follower plate $l$ and a spring actuated retaining plate $n'$, between which the film and separating sheet are deposited by the holder $g'$, substantially as described.

5. In a photographic film camera having two dark chambers, the combination with a package of ribbed separating sheets to go between the films, a platform recessed at its front edge to support the said package of films in one dark chamber, and allow the said ribs on the separating sheets to pass freely, and means for removing the forward film and
5 separating card into the other dark chamber; of the sliding plate $l$, arranged to act in conjunction with the guides $n$, the platform $n'$ with spiked arms $n^2$ for piling the films and cards firmly vertically in a pack in the dark chamber and preventing a film and card 10 returning with the ascent of the holder, substantially as described.

JOHN FEATHERSTONEHAUGH PARSONS.

Witnesses:
NICHOLAS WATTS,
 *Bristol Bank Buildings, Bristol.*
CHARLES POPHAM FRENCH,
 *Bushy Park, Bristol.*